(12) United States Patent  
Kobayashi (10) Patent No.: US 7,920,301 B2  
(45) Date of Patent: Apr. 5, 2011

(54) READ DEVICE AND COPYING MACHINE

(75) Inventor: Ken Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1042 days.

(21) Appl. No.: 11/727,370

(22) Filed: Mar. 26, 2007

(65) Prior Publication Data

US 2008/0100886 A1    May 1, 2008

(30) Foreign Application Priority Data

Oct. 27, 2006   (JP) ................. P2006-293063

(51) Int. Cl.
*H04N 1/04* (2006.01)

(52) U.S. Cl. ..... 358/474; 358/498; 358/497; 271/10.01; 271/186

(58) Field of Classification Search .......... 358/498, 358/474, 497, 496, 488; 271/265.02, 10.01, 271/186
See application file for complete search history.

(56) References Cited

U.S. PATENT DOCUMENTS

| | | | | |
|---|---|---|---|---|
| 4,635,920 A | * | 1/1987 | Kodama | 271/81 |
| 4,714,241 A | * | 12/1987 | Randall | 271/3.03 |
| 6,954,290 B1 | * | 10/2005 | Braudaway et al. | 358/3.26 |
| 7,364,155 B2 | * | 4/2008 | Nagao et al. | 271/186 |
| 7,410,163 B2 | * | 8/2008 | Yamanaka | 271/186 |
| 2004/0004320 A1 | | 1/2004 | Watanabe et al. | 271/10.01 |
| 2004/0252353 A1 | * | 12/2004 | Sano et al. | 358/474 |
| 2005/0122544 A1 | * | 6/2005 | Mizuhashi et al. | 358/1.18 |
| 2006/0227389 A1 | * | 10/2006 | Yamamoto et al. | 358/496 |
| 2007/0064286 A1 | * | 3/2007 | Shiokawa et al. | 358/498 |
| 2007/0069451 A1 | * | 3/2007 | Iwago et al. | 271/186 |
| 2007/0097457 A1 | * | 5/2007 | Kawai et al. | 358/488 |
| 2007/0171487 A1 | * | 7/2007 | Chen | 358/498 |

FOREIGN PATENT DOCUMENTS

CN         1470959 A      1/2004

* cited by examiner

*Primary Examiner* — Negussie Worku (74) *Attorney, Agent, or Firm* — Morgan, Lewis & Bockius LLP (57) ABSTRACT

A read device comprises: a read part that reads information recorded on a medium being carried in a given reading position; a first regulate member, disposed more upstream in a carry direction of the medium than the reading position, that regulates a position of one surface of the medium being carried; and a second regulate member, disposed more downstream in the carry direction of the medium than the reading position, that regulates a position of the other surface of the medium being carried.

13 Claims, 7 Drawing Sheets

READ DEVICE AND COPYING MACHINE

CROSS-REFERENCE TO RELATED APPLICATIONS

This application is based on and claims priority under 35 USC 119 from Japanese Patent Application No. 2006-293063 filed Oct. 27, 2006.

BACKGROUND (i) Technical Field

The present invention relates to a read device for reading a medium being carried and a copying machine incorporating such read device therein.

(ii) Related Art

As a read device for reading and inputting a medium into a copying machine, a facsimile and a computer, there is known a read device which, while carrying a medium such as a manuscript, reads an image formed on the medium using a sensor or the like.

SUMMARY

According to first aspect of the invention, there is provided a read device comprising: a read part that reads information recorded on a medium being carried in a given reading position; a first regulate member, disposed more upstream in a carry direction of the medium than the reading position, that regulates a position of one surface of the medium being carried; and a second regulate member, disposed more downstream in the carry direction of the medium than the reading position, that regulates a position of the other surface of the medium being carried.

BRIEF DESCRIPTION OF THE DRAWINGS

Exemplary embodiments of the present invention will be described in detail based on the following figure, wherein.

DETAILED DESCRIPTION

Now, description will be given below in detail of the best mode (which is hereinafter referred to as an exemplary embodiment) for carrying out the invention.

Figure 1:
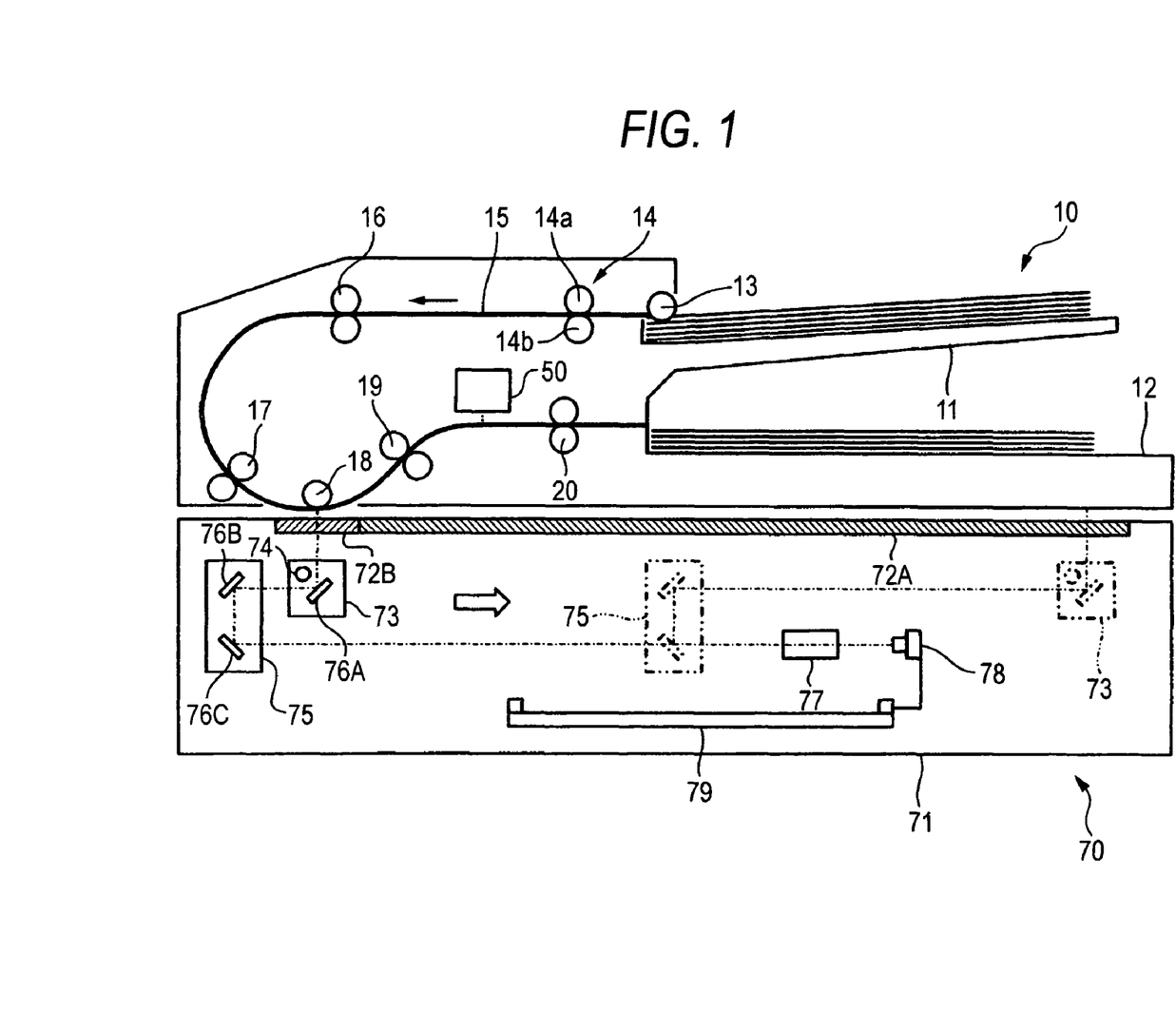
FIG. 1 is a schematic view of a read device according to an exemplary embodiment of the invention.

FIG. 1 is a schematic view of the whole structure of a read device to which the invention is applied. The present read device includes a manuscript feed device 10 for sequentially carrying manuscripts from a bundle of manuscripts placed thereon, and a scanner device 70 for reading an image on the first surface (front surface) of the manuscript by scanning.

The manuscript feed device 10 includes a manuscript storage part 11 for placing thereon a manuscript bundle composed of two or more manuscripts, and a discharged manuscript storage part 12 disposed downwardly of the manuscript storage part 11 for placing thereon the manuscripts that have been read. Also, the manuscript feed device 10 further includes a take-out roller 13 for taking out the manuscripts from the manuscript storage part 11 and carrying them. Further, on the side existing more downstream in the manuscript carry direction than the take-out roller 13, there is disposed an arrange mechanism 14 for arranging the manuscripts into individually separated ones. The arrange mechanism 14 includes a feed roller 14a for carrying the manuscripts, which are supplied from the take-out roller 13, further downstream, and a retard roller 14b for arranging the manuscripts supplied from the take-out roller 13 into individually separated ones. On a carry passage 15 through which the manuscripts are carried, sequentially in the order starting from the upstream side of the manuscript carry direction, there are disposed a pre-registration roller 16, a registration roller 17, a platen roller 18, an out roller 19 and a discharge roller 20. The pre-registration roller 16 carries the individually arranged manuscripts toward the roller disposed downstream side and also arranges the manuscripts into a loop shape. The registration roller 17 is structured such that, after it rotates and stops once, it resumes its rotation to a proper timing to supply the manuscripts while enforcing a registration adjustment on a manuscript read part (which will be discussed later). The platen roller 18 assists the carry of the manuscript being read by the scanner device 70. The out roller 19 carries further downstream the manuscript which has been read by the scanner device 70. And, the discharge roller 20 carries the thus read manuscript still further and also discharges it to the discharged manuscript storage part 12.

Also, in the manuscript feed device 10, between the out roller 19 and discharge roller 20, there is interposed a CIS (Contact Image Sensor) 50 which is used to read the second surface (rear surface) of the manuscript.

On the other hand, the scanner device 70 supports the manuscript feed device 10 in an openable and closable manner, supports the manuscript feed device 10 using a device frame 71, and reads the image of the manuscript carried by the manuscript feed device 10. The scanner device 70 includes the device frame 71 formed in a box body, a first platen glass 72A on which the manuscript the image of which is to be read can be placed in a stationary state, and a second platen glass 72B having an optical opening for reading the manuscript being carried by the manuscript feed device 10.

And, the scanner device 70 also includes: a full rate carriage 73 which stands still below the second platen glass 72B or scans the whole of the first platen glass 72A to thereby read the image of the manuscript; and, a half rate carriage 75 which supplies the light obtained from the full rate carriage 73 to an image forming part. The full rate carriage 73 includes a lighting lamp 74 for radiating the light onto the manuscript and a first mirror 76A for receiving the reflected light obtained from the manuscript. Also, the half rate carriage 75 includes a second mirror 76B and a third mirror 76C for supplying the light obtained from the first mirror 76A to the image forming part. The scanner device 70 further includes an image forming lens 77 and a CCD (Charge Coupled Device) image sensor 78. The image forming lens 77 optically reduces an optical image obtained from the third mirror 76C. And, the CCD image sensor 78 photo-electrically converts an optical image formed by the image forming lens 77. That is, in the scanner device 70, an image is formed on the CCD image sensor 78 using a so called reducing optical system. And, the scanner device 70 still further includes a control/image process unit 79. The control/image process unit 79 enforces a given processing on the image data of the front and rear surfaces of the manuscript inputted from the CCD image sensor 78 or a CIS 50 (which will be discussed later in detail). Also, the control/image process unit 79 controls the respective reading operations of the present read apparatus.

In a fixed read mode for reading the image of the manuscript placed on the first platen glass 72A, the full rate carriage 73 and half rate carriage 75 move in the scanning direction (in the arrow mark direction in FIG. 1) at a rate of 2:1. At the then time, the light of the lighting lamp 74 of the full rate carriage 73 is radiated onto the reading surface of the manuscript. And, the reflected light from the manuscript surface is then reflected onto the first mirror 76A, second mirror 76B and third mirror 76C sequentially in this order and is guided to the image forming lens 77. The light guided to the image forming lens 77 is image formed on the light receiving surface of the CCD image sensor 78. The CCD image sensor 78 is a one-dimensional sensor and processes the images of the manuscript corresponding to one line of the manuscript at the same time. The full rate carriage 73 and half rate carriage 75 are moved in the direction of this line (in the sub scanning direction) to thereby read the next line of the manuscript. By executing this operation repeatedly over the whole of the manuscript, the reading of one page of the manuscript can be completed.

On the other hand, the second platen glass 72B is made of, for example, a transparent glass plate having a rectangular plate-shaped structure. In a carry read mode for reading the image of the manuscript being carried by the manuscript feed device 10, the manuscript being carried passes on and along the second platen glass 72B. At the then time, the full rate carriage 73 and half rate carriage 75 are held stationary at positions shown by two-dot chain lines in FIG. 1. And, the reflected light of the first line of the manuscript having passed through the platen roller 18 of the manuscript feed device 10 is image formed through the first mirror 76A, second mirror 76B and third mirror 76C on the image forming lens 77, and the image is read in by the CCD image sensor 78. That is, after the images of the first line of the manuscript in the main scanning direction are processed simultaneously by the CCD image sensor 78 composed of a one-dimensional sensor, the images of the next line in the main scanning direction of the manuscript being carried by the manuscript feed device 10 are read in by the CCD image sensor 78. After the leading end of the manuscript reaches the reading position of the second platen glass 72B, the trailing end of the manuscript passes through the reading position of the second platen glass 72B, thereby completing the reading of one page of the manuscript in the sub scanning direction.

According to the present exemplary embodiment, in this manner, the full rate carriage 73 and half rate carriage 75 can be made to stop and, when carrying the manuscript the image of the first surface of which is to be read by the CCD image sensor 78 through the second platen glass 72B, the image of the second surface of the manuscript can be read in a batch processing. That is, by carrying the present manuscript to the carry passage 15 only once, the images of the both of front and rear surfaces of the present manuscript can be read using the CCD image sensor 78 and CIS 50. Here, in the present exemplary embodiment, the reading position of the second surface of the manuscript by the CIS 50 is shifted to the downstream side of the manuscript carry direction with respect to the reading position of the first surface of the manuscript by the CCD image sensor 78.

Figure 2:
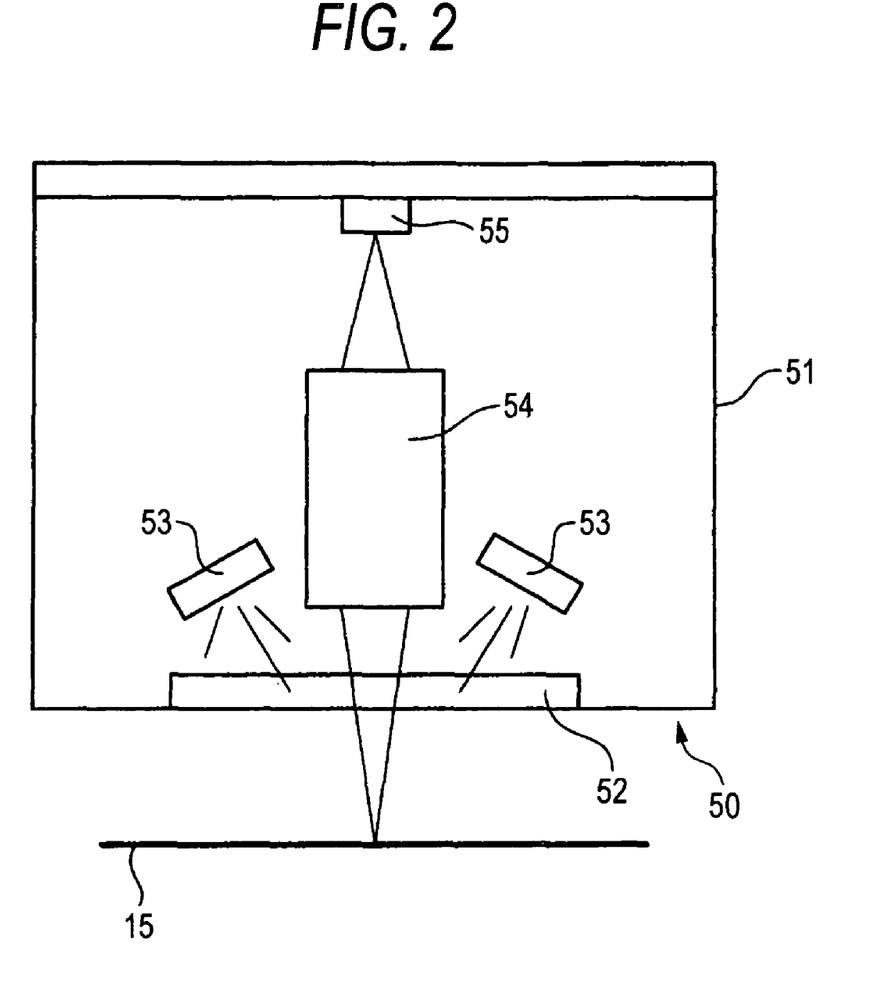
FIG. 2 is an explanatory view of the structure of a CIS (Contact Image Sensor)

Now, FIG. 2 is an explanatory view of the structure of the CIS 50. The CIS 50 which functions as a read part, as shown in FIG. 1, is interposed between the out roller 19 and discharge roller 20. One surface (the first surface) of the manuscript is pressed against the second platen glass 72B and the images of the first surface are read in by the CCD image sensor 78. On the other hand, the CIS 50 reads in the images of the other surface (the second surface) of the manuscript from the other side thereof opposed to the CCD image sensor 78 with the carry passage 15 between them. This CIS 50 includes a housing 51, a glass 52, LED (Light Emitting Diode) arrays 53, a rod lens array 54, and a line sensor 55. The glass 52 is mounted on an opening which is formed in the housing 51 on the carry passage 15 side thereof. And, the LED lens arrays 53 are used to radiate the lights onto the second surface of the manuscript through the glass 52. The rod lens array 54 condenses the reflected lights of the radiated lights from the LED arrays 53. The line sensor 55 reads the light condensed by the rod lens array 54. And, as the line sensor 55, there can be used a CCD, a CMOS sensor, a contact-type sensor or the like; and, the line sensor 55 is able to read the image of an actual size width (for example, A4 longitudinal width 297 mm). That is, in the CIS 50, the reducing optical system is not used but a so called life-size optical system using the rod lens array 54 and line sensor 55 is used to read the images of the manuscript.

Figure 3:
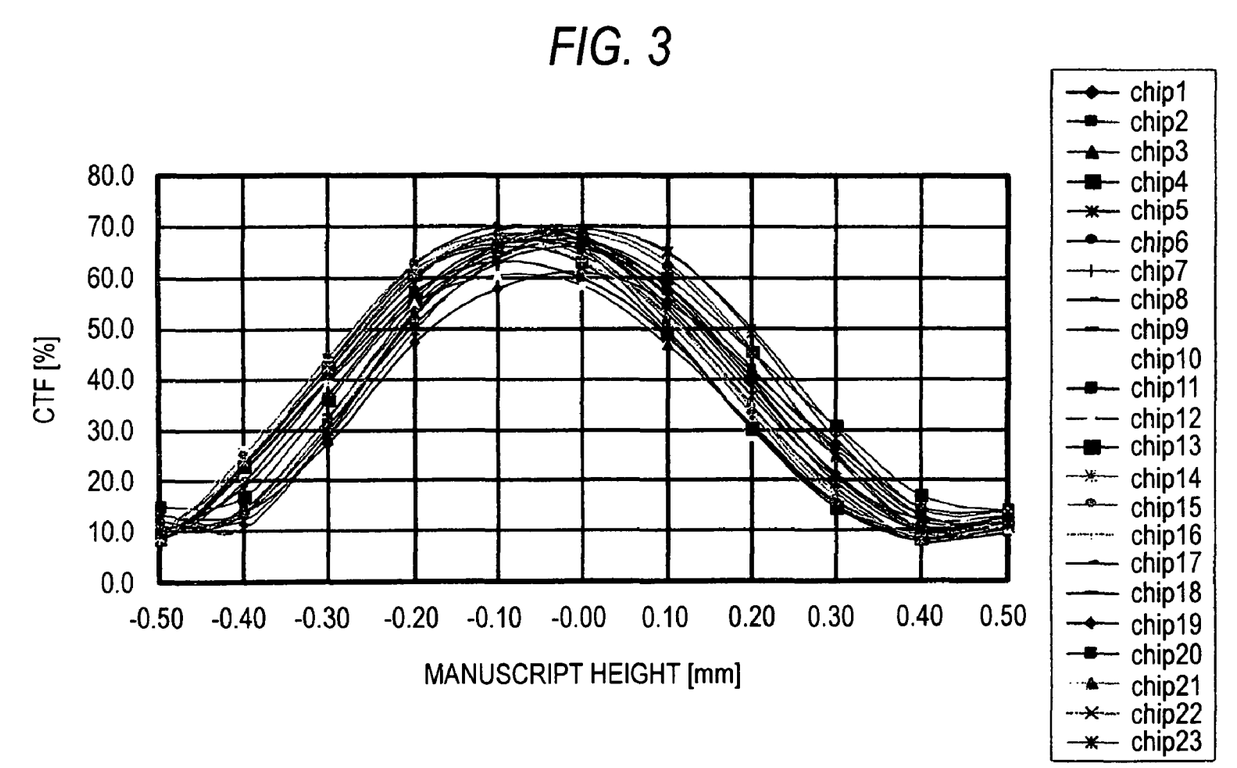
FIG. 3 is a graphical representation of the relationship between the manuscript height relative to the CIS and a CTF (Contrast Transfer Function)

In the life-size optical system as in the CIS 50, when compared with the reducing optical system, the depth of focus of the lens system is shallow. Here, FIG. 3 is a graphical representation to explain the depth of focus of the CIS 50. In FIG. 3, the horizontal axis expresses the height of the manuscript with respect to the CIS 50, whereas the vertical axis expresses the values of a CTF (Contrast Transfer Function). In this example, evaluation is made using 23 chips (Chip 1~Chip 23) which are randomly selected. In FIG. 3, as regards the manuscript height, suppose the focal position of the CIS 50 is set as 0, that is, as a reference position, the negative direction of the manuscript height expresses a case where the manuscript is moved toward the CIS 50 from the focal position, whereas the positive direction expresses a case where the manuscript is moved further apart from the focal position. Also, the CTF is one of indexes which express the resolution of a scanner; and, the CTF expresses whether, when black and white ladder (striped) patterns arranged at minute intervals are read by a scanner, the scanner can reproduce faithfully the spatial information owned by the ladder patterns from a low frequency area to a high frequency area or not.

For example, suppose a target level is set for CTF 20% or higher when reading the manuscript, when the CIS 50 is used, it can be understood that the height of the manuscript must be set in the range of ±0.25 mm from the focal position. By the way, for example, in the scanner device 70 using the reducing optical system, in order to secure CTF 20% or higher similarly to the CIS 50, the range of the order of ±2~4 mm is allowed. In other words, when the CIS 50 is used, it is important that the manuscript height at the reading position of the CIS 50 is maintained constant. However, in this example, since the CIS 50 is used in the carry read mode, there is a fear that the height of the manuscript in the reading position can vary due to the irregular movements of the manuscript. To cope with this, in the present exemplary embodiment, the structure of the carry passage 15 in the periphery of the reading position is improved to thereby prevent the height of the manuscript from varying with respect to the CIS 50.

Figure 4:
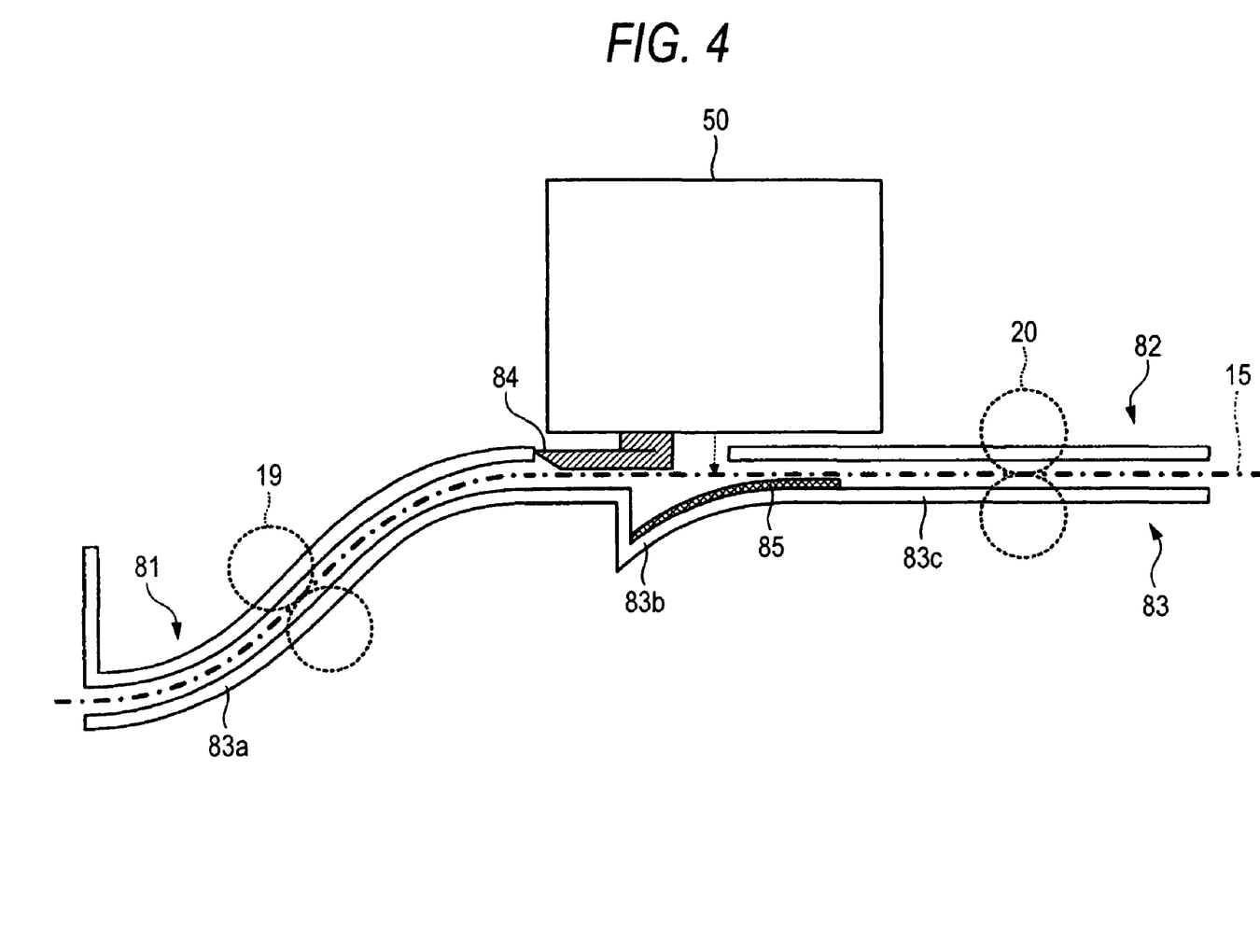
FIG. 4 is an explanatory view of the structure of a carry passage in the periphery of the CIS.
Figure 5:
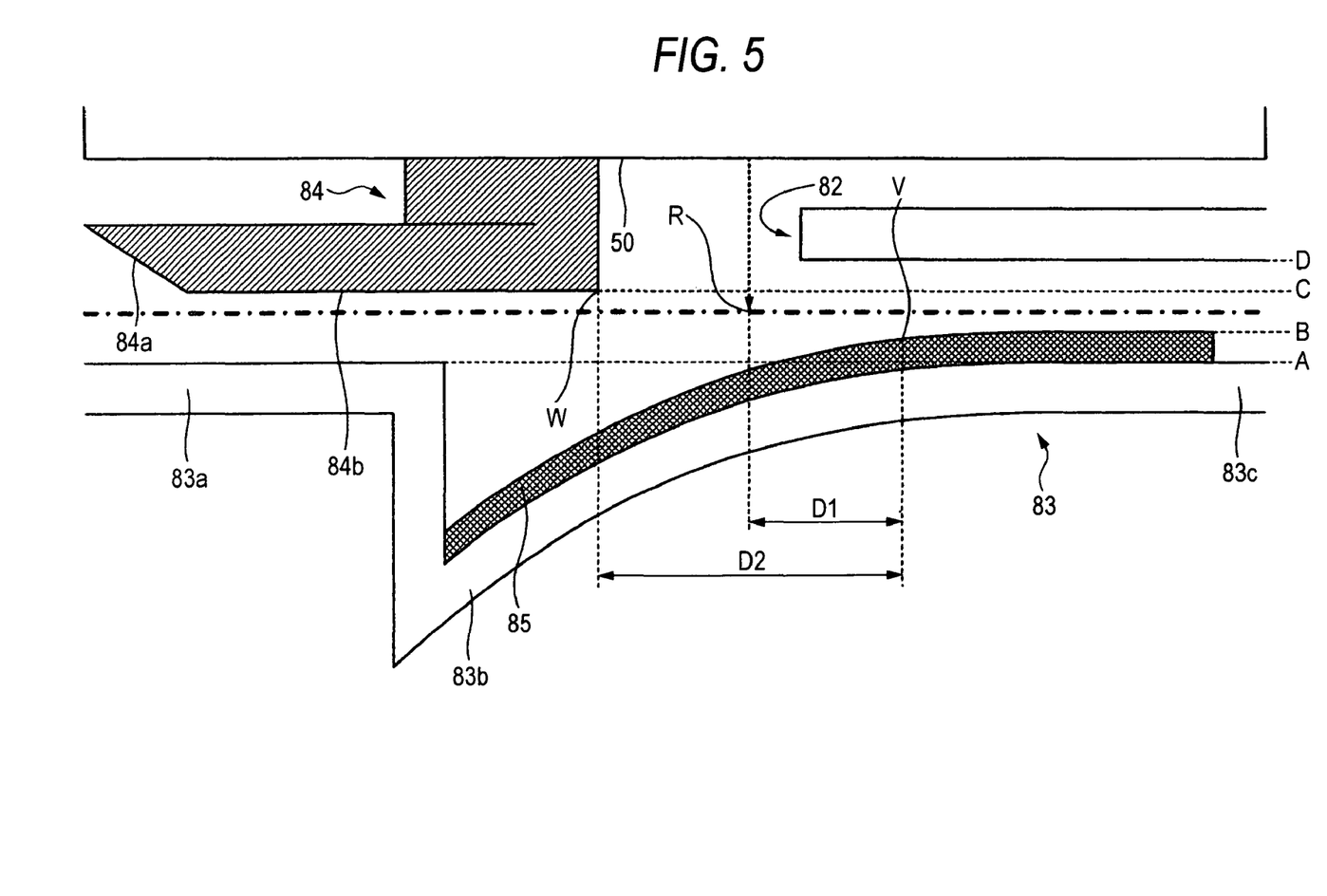
FIG. 5 is an enlarged view of the main portions of FIG. 4.

Now, FIG. 4 is an explanatory view of the structure of the carry passage 15 in the periphery of the CIS 50 and FIG. 5 is an enlarged view of the main portions of FIG. 4. The carry passage 15 in this portion is composed of a first manuscript guide member 81, a second manuscript guide member 82, a third manuscript guide member 83, a regulate plate 84, and a resin sheet 85.

The first manuscript guide member 81 is disposed on the upper portion of the carry passage 15 which exists more upstream in the manuscript carry direction than the reading position R of the CIS 50. Also, the first manuscript guide member 81 is inclined obliquely upward from the upstream side toward the downstream side in the manuscript carry direction.

The second manuscript guide member 82 is disposed on the upper portion of the carry passage 15 which exists more downstream in the manuscript carry direction than the reading position R. The second manuscript guide member 82 extends almost horizontally from the upstream toward the downstream in the manuscript carry direction. And, between the first and second manuscript guide members 81 and 82, there is formed a clearance through which the input and output lights of the regulate plate 84 (which will be discussed later) and CIS 50 are allowed to pass.

The third manuscript guide member 83 is disposed on the lower portion of the carry passage 15 with the reading portion R between them, that is, on the lower side of the first and second manuscript guide members 81 and 82. This third manuscript guide member 83 includes an inclined portion 83a, a recessed portion 83b and a horizontal portion 83c which are arranged sequentially in the order starting from the upstream side in the manuscript carry direction. The inclined portion 83a is disposed below the first manuscript guide member 81 and is inclined obliquely upward from the upstream side toward the downstream side in the manuscript carry direction. The recessed portion 83b is disposed below the reading position R. The recessed portion 83b is inclined obliquely upward from the upstream side toward the downstream side in the manuscript carry direction. And, the horizontal portion 83c is disposed below the second manuscript guide member 82 and extends almost horizontally from the upstream side toward the downstream side in the manuscript carry direction.

The first, second and third manuscript guide members 81, 82 and 83 can be made of, for example, molded resin.

The regulate plate 84, which functions as a first regulate member, a first guide member or an upstream side guide member, is disposed on the upper portion of the carry passage 15 which exists more downstream in the manuscript carry direction than the first manuscript guide member 81 and more upstream in the manuscript carry direction than the reading position R. This regulate plate 84 can be made of a metal plate such as a stainless steel plate produced by bending working. On the manuscript carry direction upstream side of the regulate plate 84, there is formed an inclined surface 84a which is inclined along the manuscript carry direction in a direction to narrow the carry passage 15; and, on the lower surface of the regulate plate 84, that is, on the opposite side of the carry passage 15, there is formed a regulate surface 84b which continues with the inclined surface 84a and extends almost horizontally. Here, according to the present exemplary embodiment, the regulate plate 84 is mounted directly on the CIS 50. However, it is not always necessary to mount the regulate plate 84 on the CIS 50, but the CIS 50 and regulate plate 84 may also be mounted separately. Also, the CIS 50 and regulate plate 84 may also be formed as an integral body.

The resin sheet 85, which functions as a second regulate member, a second guide member or a downstream side guide member, is mounted on the third manuscript guide member 83 in such a manner that it steps across the reading position R. Specifically, the resin sheet 85 is bonded to the portions of the third manuscript guide member 83 that extend from the recessed portion 83b to the horizontal portion 83c. The resin sheet 85 is colored white and it can be used, for example, to detect the adhesion of dirt to the CIS 50 or to measure variations in the quantity of light of the whole of the CIS 50.

Here, as shown in FIG. 5, the position of the upper surface of the inclined portion 83a, which exists more upstream in the manuscript carry direction than the reading position R and constitutes the lower wall of the carry passage 15, is defined as an upper surface position A. Also, the position of the upper surface of the resin sheet 85, which exists more downstream in the manuscript carry direction than the reading position R and constitutes the lower wall of the carry passage 15, is defined as a resin sheet surface position B. Further, the position of the regulate surface 84b, which exists more upstream in the manuscript carry direction than the reading position R and constitutes the upper wall of the carry passage 15, is defined as a regulate surface position C. Still further, the position of the lower surface of the second manuscript guide member 82, which exists more downstream in the manuscript carry direction than the reading position R and constitutes the upper wall of the carry passage 15, is defined as a lower surface position D.

In this example, the resin sheet surface position B is set at a higher position than the upper surface position A. Also, the regulate surface position C is set a higher position than the resin sheet surface position B. Further, the lower surface position D is set at a higher position than the regulate surface position C.

Also, in this example, a height-direction clearance between the upper surface position A and regulate surface position C is set larger than the maximum sheet thickness that can be read by the present read device. Also, a height-direction clearance between the resin sheet surface position B and lower surface position D is also set larger than the maximum sheet thickness. On the other hand, a height-direction clearance between the resin sheet surface position B and regulate surface position C, that is, a clearance between the regulate surfaces is set smaller than the minimum sheet thickness that can be carry read by the present read device.

Also, in this example, a distance D1 between a contact start position V, where the manuscript being carried starts its contact with the resin sheet 85, and the reading position R is set within 10 mm, specifically, of the order of 5 mm. And, in this example, a distance D2 between the contact start position V and a regulate end position W, which is the end of the regulate surface 84b on the most downstream side in the manuscript carry direction, is set of the order of 10 mm.

Figure 6A:
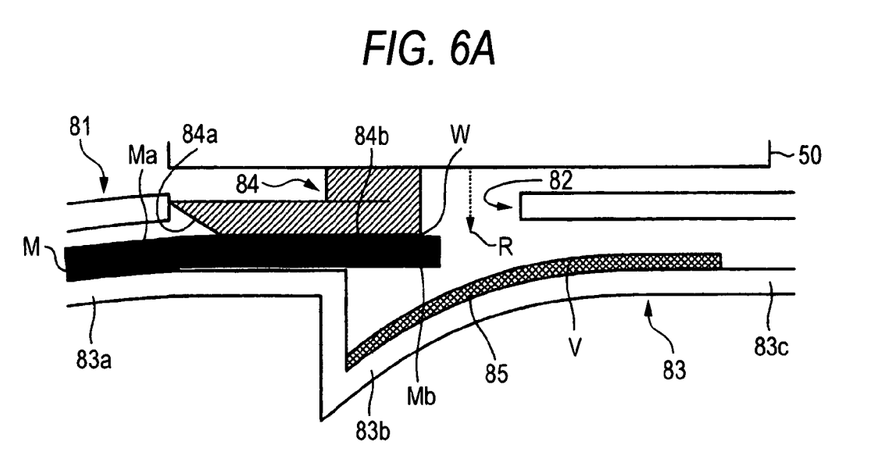
FIGS. 6A and 6B are respectively explanatory views of the movement of a manuscript passing through the reading position of the CIS.
Figure 6B:
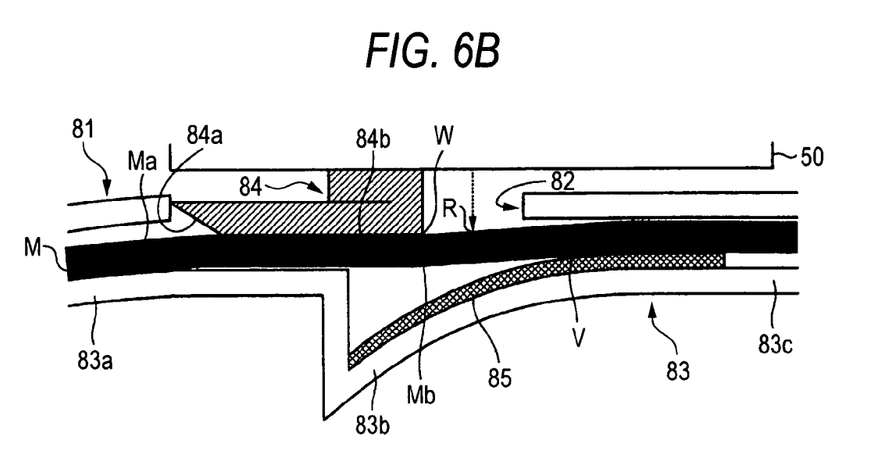

Now, FIGS. 6A and 6B are respectively explanatory views of the movements of a manuscript M functioning as a medium which passes through the reading position R of the CIS 50 via the above-structured carry passage 15.

Firstly, the manuscript M, as shown in FIG. 6A, is carried from the left direction toward the right obliquely upward direction in FIG. 6A between the first manuscript guide member 81 and the inclined portion 83a of the third manuscript guide member 83. As a result of this, the upper surface of the manuscript M, that is, a surface to be read Ma, which is to be read by the CIS 50, is brought into contact with the regulate surface 84b of the regulate plate 84. By the way, the surface to be read Ma corresponds to the above-mentioned second surface. At the then time, the manuscript M is guided downward by the inclined surface 84a and the surface to be read Ma thereof is contacted with the regulate surface 84b. By the way, the surface not to be read Mb of the manuscript M, which exists on the rear side of the surface to be read Ma, floats up slightly from the inclined portion 83a. The surface not to be read Mb corresponds to the above-mentioned first surface. And, the manuscript M is carried further toward the right side in FIG. 6A in contact with the regulate surface 84b in such a manner that the height of the surface to be read Ma is regulated by the regulate surface 84b.

Next, the manuscript M, which has passed through the regulate end portion W of the regulate surface 84b, as shown in FIG. 6B, passes through the reading position R of the CIS 50. In the reading position R, there is formed the recessed portion 83b in the third manuscript guide member 83 which exists on the rear side of the manuscript M. Thanks to this, the manuscript M is allowed to pass through the reading position R without being contacted with the resin sheet 85 bonded to the third manuscript guide member 83. Also, the manuscript M having passed through the regulate end position W is going to hang down downwardly due to the weight of the manuscript M itself; however, the surface not to be read Mb of the manuscript M is contacted with the resin sheet 85 at the contact start position V during carriage, which prevents the manuscript M from hanging down but lifts it upwardly. At the then time, the resin sheet 85 is disposed so as to narrow the carry passage 15 obliquely upward along the recessed portion 83b and thus the manuscript M is allowed to move smoothly along this inclination. By the way, the contact start position V varies according to the sheet quality of the manuscript M and, the weaker the texture of a sheet constituting the manuscript M is, the nearer the contact start position V approaches the reading position R. Also, the surface to be read Ma of the manuscript M is slightly apart from the second manuscript guide member 82.

Thanks to the above structure, on the more upstream side in the manuscript carry direction than the reading position R, since the surface to be read Ma is regulated by the regulate surface 84b, the height of the manuscript M is regulated from above. In other words, the regulate surface 84b prevents the manuscript M from approaching the CIS 50 functioning as a reading part. On the other hand, on the more downstream side in the manuscript carry direction than the reading position R, because the surface not to be read Mb is contacted with the upper surface of the resin sheet 85, the height of the manuscript M is regulated from below. That is, the upper surface of the regulate sheet 85 prevents the manuscript M from moving apart from the CIS 50 which functions as the reading part. Thus, the height of the surface to be read Ma of the manuscript M in the reading position R is maintained almost constant, for example, in the range of ±0.25 mm from the focal position of the CIS 50. That is, the position of the manuscript M in the reading position R of the CIS 50 can be stabilized.

And, in the reading position R, the lights radiated from the LED arrays 53 of the CIS 50 shown in FIG. 2 are radiated onto the surface to be read Ma of the manuscript M, and the reflected light thereof is image formed on the line sensor 55 through the rod lens array 54. At the then time, since the height of the manuscript M is positioned in the above-mentioned manner, for example, even when the carry speed of the manuscript M varies, variations in the height of the manuscript M are hard to occur.

Figure 7:
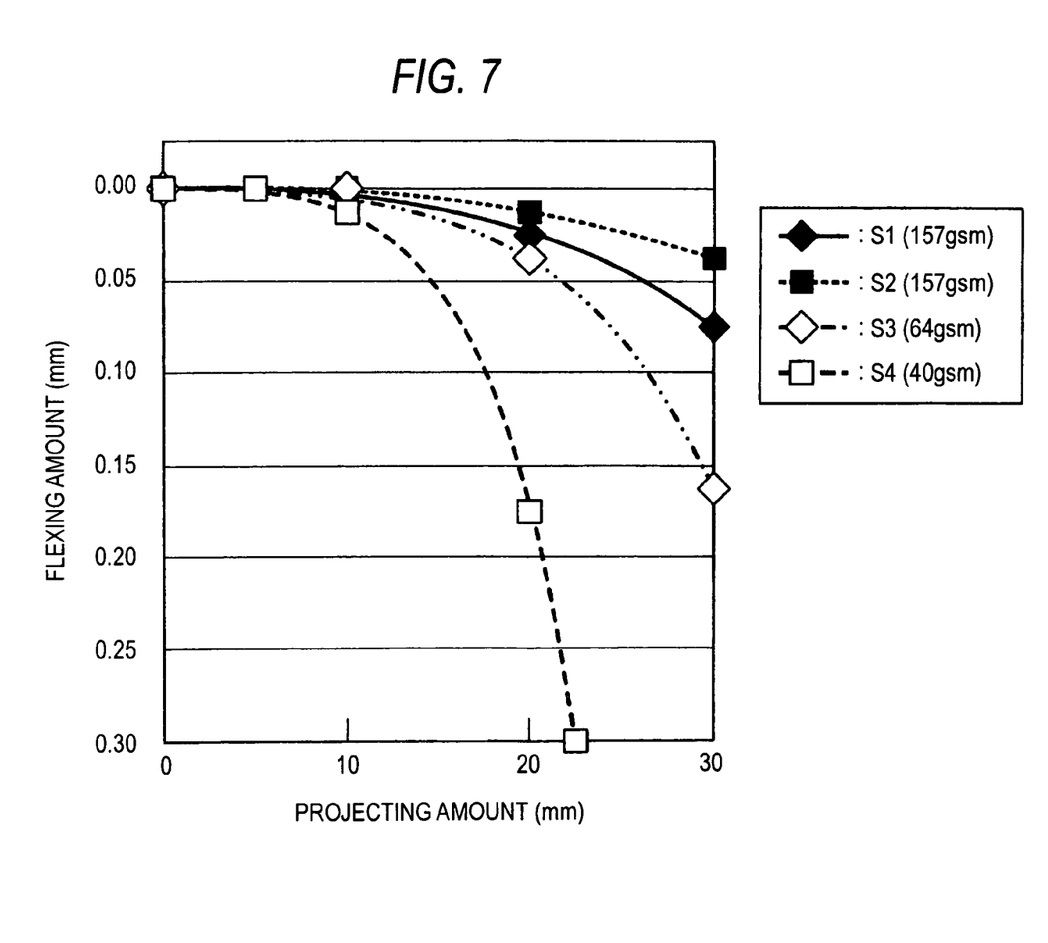
FIG. 7 is a graphical representation of the relationship between the projecting amounts and flexing amounts of various sheets.

Now, description will be given here of the reason why the distance D1 between the reading position and contact start position V R is set within 10 mm. FIG. 7 is a graphical representation of the projecting amounts and flexing amounts of various sheets constituting the manuscript M when one end portion of each sheet is projected. In this case, examinations have been made on four kinds of sheet samples S1~S4 that can be carry read by a read device according to the present exemplary embodiment. Here, the space amount of each of the samples S1 and S2 is 157 gsm (gram per square meter), the space amount of the sample S3 is 64 gsm, and the space amount of the sample S4 is 40 gsm.

FIG. 7 shows that, in every sample, the larger the projecting amount is, the larger the flexing amount is. Also, generally, the smaller the space amount is, the thinner the sheet is; and, the smaller the space amount is, the weaker the texture is. Therefore, it is also known that, the smaller the space amount is, the larger the flexing amount is with respect to the same projecting amount; that is, the hang-down of the manuscript M is easier to occur. However, as can be seen clearly from FIG. 7, in every sample, when the projecting amount is within 10 mm, the amount of flexing occurring is very small, or, it shows a level which can be said to be almost 0. For this reason, according to the present exemplary embodiment, by setting the distance D1 between the reading position R and contact start position V within 10 mm, specifically, of the order of 5 mm, variations in the height of the manuscript M in the reading position R caused by the flexure of the sheet constituting the manuscript M are prevented. Also, according to the present exemplary embodiment, since the distance D2 between the regulate end position W existing more upstream in the manuscript carry direction than the reading position R and the contact start position V existing on the downstream side in the manuscript carry direction is set for 10 mm, the influence of the flexure of the manuscript M in the reading position R can be further reduced.

Although, in the present exemplary embodiment, the visible image formed on the manuscript is read using the read device, this is not limitative. For example, an invisible image (for example, an infrared image) formed on the manuscript can also be read, or, a pattern formed on the manuscript itself can also be read.

Also, in the present exemplary embodiment, the first surface of the manuscript is read using a reducing optical system. However, such first surface can also be read using a life-size optical system. In this case, preferably, a regulate member or a guide member may be disposed on the upstream and downstream sides of the first surface reading position of the manuscript.

Further, according to the present exemplary embodiment, description has been given of the CIS 50 which uses a life-size optical system. However, the invention is not limited to this but the invention can also be applied to a read part using a reducing optical system.

Still further, in the present exemplary embodiment, description has been given of the invention using the present read device. However, this is not limitative but the read device can also be combined with, for example, a printer device which forms an image on a sheet functioning as a recording medium. In this case, such combined apparatus can be used as a copying machine in which the image of a manuscript read by the read device can be formed on the sheet by the printer device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A read device comprising:
   a read part that reads information recorded on a medium being carried in a given reading position;
   a first regulating member, disposed more upstream in a carry direction of the medium than the reading position, that regulates a position of one surface, which is read by the read part, of the medium being carried; and
   a second regulating member, disposed more downstream in the carry direction of the medium than the reading position, that regulates a position of the other surface, which is not read by the read part, of the medium being carried, wherein
   the second regulating member includes a curved portion and a horizontal portion which is substantially parallel to the carry direction of the medium,
   the curved portion is disposed more upstream in the carry direction of the medium than the horizontal portion, and
   the curved portion extends from an upstream side of the carry direction to a downstream side of the carry direction so as to gradually approach to a locus of the medium being conveyed.

2. The read device as set forth in claim 1,
   wherein the first regulating member regulates, as the position of the one surface of the medium, a vertical-direction upper surface of the medium, and
   the second regulating member regulates, as the position of the other surface of the medium, a vertical-direction lower surface of the medium.

3. The read device as set forth in claim 1,
   wherein the read part comprises a contact image sensor.

4. The read device as set forth in claim 1,
   wherein a clearance between a first regulating surface of the first regulating member and a second regulating surface of the second regulating member in a direction perpendicular to the carry direction of the medium is smaller than the minimum thickness of the medium that can be carried.

5. A read device comprising:
   a read part that reads information recorded on a medium being carried in a given reading position;
   a first guiding member, disposed more upstream in a carry direction of the medium than the reading position, that guides the medium while in contact with one surface, which is read by the read part, of the medium being carried; and
   a second guiding member, disposed more downstream in the carry direction of the medium than the reading position, that guides the medium while in contact with the other surface, which is not read by the read part, of the medium being carried, wherein
   the read part is disposed such that the reading position is within about 10 mm from a contact start position between the second guiding member and the medium.

6. The read device as set forth in claim 5,
   wherein the first guiding member can be contacted with, as the one surface of the medium, a vertical-direction upper surface of the medium, and
   the second guiding member can be contacted with, as the other surface of the medium, a vertical-direction lower surface of the medium.

7. The read device as set forth in claim 5,
   wherein height of a space between a first medium contact surface of the first guiding member and a second medium contact surface of the second guiding member is set such that a variation in a position of the medium in the reading position is substantially equal to or less than a depth of focus of the read part.

8. A read device comprising:
   a carry passage that carries a medium;
   a read part that reads the medium being carried along the carry passage in a given reading position;
   an upstream side guiding member, disposed in the carry passage existing more upstream in a carry direction of the medium than the reading position, that guides the medium in such a manner that the medium is prevented from approaching the read part; and
   a downstream side guiding member, disposed in the carry passage existing more downstream in the carry direction of the medium than the reading position, that guides the medium in such a manner that the medium is prevented from parting away from the read part, wherein
   the upstream guiding member is in contact with one surface, which is read by the read part, of the medium being carried while guiding the medium,
   the downstream guiding member is in contact with the other surface, which is not read by the read part, of the medium being carried while guiding the medium,
   the downstream side guiding member is disposed so as to narrow the carry passage from an upstream side toward a downstream side in the carry direction of the medium, and
   the downstream side guiding member extends across a position which is just below the reading position.

9. The read device as set forth in claim 8,
   wherein the read part and the upstream side guiding member are disposed on an upper side in a vertical direction of the carry passage, and the downstream side guiding member is disposed on the lower side in the vertical direction of the carry passage; and
   a portion of the carry passage existing more upstream in the carry direction of the medium than an installation position of the upstream side guiding member is inclined upwardly from below.

10. The copying machine comprising:
    a read device as set forth in claim 1,
    wherein image information read by the read device is copied onto a recording medium.

11. The read device as set forth in claim 1, wherein the curved portion extends across a position which is located just below the reading position.

12. The read device as set forth in claim 1, wherein the read part is disposed such that the reading position is within about 10 mm from a contact start position between the second regulating member and the medium.

13. The read device as set forth in claim 1, wherein the second regulating member includes a resin sheet.

* * * * *